United States Patent
Fan et al.

(10) Patent No.: US 12,217,886 B2
(45) Date of Patent: Feb. 4, 2025

(54) DATA TRANSMISSION CABLE AND RELATED DEVICE

(71) Applicant: HUAWEI TECHNOLOGIES CO., LTD., Guangdong (CN)

(72) Inventors: Shangbin Fan, Shenzhen (CN); Pengwei Ma, Shenzhen (CN); Chao Chen, Shanghai (CN); Tao Gong, Dongguan (CN); Hongli Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 175 days.

(21) Appl. No.: 17/985,333

(22) Filed: Nov. 11, 2022

(65) Prior Publication Data

US 2023/0076232 A1    Mar. 9, 2023

Related U.S. Application Data

(63) Continuation of application No. PCT/CN2021/093549, filed on May 13, 2021.

(30) Foreign Application Priority Data

May 14, 2020   (CN) .......................... 202010409589.6

(51) Int. Cl.
*H01B 11/10*    (2006.01)
*H01B 7/00*     (2006.01)
(Continued)

(52) U.S. Cl.
CPC ....... *H01B 11/1091* (2013.01); *H01B 7/0054* (2013.01); *H01B 11/18* (2013.01);
(Continued)

(58) Field of Classification Search
CPC . H01B 11/1091; H01B 11/002; H01B 11/005; H01B 11/02; H01B 11/06; H01B 11/08; H01B 9/02
See application file for complete search history.

(56) References Cited

U.S. PATENT DOCUMENTS 10,096,953 B1 *   10/2018   Finnestad ............ H01R 13/658
2011/0259626 A1 * 10/2011   Speer ..................... H01B 11/10
                                                                174/113 C
(Continued)

FOREIGN PATENT DOCUMENTS

CN      101316011 A    12/2008
CN      201215742 Y     4/2009
(Continued)

OTHER PUBLICATIONS

Chinese International Search Report and Written Opinion issued in PCT/CN2021/093549 dated Aug. 17, 2021.
(Continued)

*Primary Examiner* — Timothy J Thompson
*Assistant Examiner* — Amol H Patel

(57) ABSTRACT

A data transmission cable (100) includes: a signal bundle (110), where the signal bundle (110) includes at least three signal cables, the at least three signal cables are disposed at intervals, pairwise signal cables form a differential pair signal cable, and the differential pair signal cable is used to transmit a differential data signal; a ground cable (120), where the ground cable (120) encircles and covers the signal bundle (110), and the ground cable (120) is used to transmit a ground signal and isolate the signal bundle (110) from a signal bundle (110) of another data transmission cable (100); and a filling medium (130), where the filling medium (130) is disposed in space on an inner side of the ground cable (120) except the signal cable, so that a problem that a MIPI
(Continued)

bus has poor transmission quality and a short transmission distance can be resolved.

19 Claims, 6 Drawing Sheets

(51) Int. Cl.
    *H01B 11/08*     (2006.01)
    *H01B 11/18*     (2006.01)
    *H01B 13/32*     (2006.01)
    *H04N 7/10*     (2006.01)
    *H04N 23/65*     (2023.01)
    *H04N 23/66*     (2023.01)

(52) U.S. Cl.
    CPC ............. *H01B 13/32* (2013.01); *H04N 7/108* (2013.01); *H04N 23/65* (2023.01); *H04N 23/66* (2023.01)

(56) References Cited

U.S. PATENT DOCUMENTS

2014/0318859 A1* 10/2014 Van Rens ............. H01B 7/048
                                                                   174/103
2016/0181682 A1   6/2016  Zhao et al.
2019/0214164 A1*  7/2019  Chung ................... H01R 24/20
2020/0066426 A1   2/2020  Kelley et al.

FOREIGN PATENT DOCUMENTS

| | | |
|---|---|---|
| CN | 202013757 U | 10/2011 |
| CN | 202434261 U | 9/2012 |
| CN | 104102184 A | 10/2014 |
| CN | 205670456 U | 11/2016 |
| CN | 206225061 U | 6/2017 |
| CN | 206271469 U | 6/2017 |
| CN | 106961541 A | 7/2017 |
| CN | 107707861 A | 2/2018 |
| CN | 108459980 A | 8/2018 |
| CN | 209729555 U | 12/2019 |
| TW | 201818429 A | 5/2018 |

OTHER PUBLICATIONS

Chinese Office Action issued in Chinese Application No. 202010409589.6 dated Mar. 8, 2022.
Chinese Office Action issued in Chinese Application No. 202010409589.6 dated Oct. 8, 2022.

* cited by examiner

Data transmission cable 100

DATA TRANSMISSION CABLE AND RELATED DEVICE

CROSS-REFERENCE TO RELATED APPLICATIONS

This application is a continuation of International Application No. PCT/CN2021/093549, filed on May 13, 2021, which claims priority to Chinese Patent Application No. 202010409589.6, filed on May 14, 2020. The disclosures of the aforementioned applications are hereby incorporated by reference in their entireties.

TECHNICAL FIELD

This specification relates to the field of electronic technologies, and in particular, to a data transmission cable and a related device.

BACKGROUND

A mobile industry processor interface (MIPI) bus is a data transmission interface technology used for communication between chips. Currently, applications (including communication between chips such as a camera, a display, and a memory) of the MIPI bus in a terminal field are increasingly widespread. MIPI C-PHY is a serial interface technology based on a three-wire three-level coding scheme and an embedded clock mechanism, and a current C-PHY interface rate reaches 10.26 Gbps. With a complete ecological industry chain and excellent technical features such as high bandwidth and low power consumption, a MIPI bus technology is to be widely used on a chip of a terminal device for a long time to come, and is to become a mainstream standard interface of chip manufacturers such as Sony, Samsung, and Qualcomm.

A high-speed MIPI signal has strict requirements on link loss and electromagnetic interference. If the loss is excessively high and the interference is excessively large in a transmission process, signal transmission quality and a signal transmission distance are affected, and consequently, signal decoding fails. As a MIPI C-PHY signal rate increases from 7.98 Gbps to 10.26 Gbps, a MIPI bus of a given length is increasingly affected by link loss and signal interference. Therefore, a technology is required to resolve a problem that the MIPI bus has poor transmission quality and a short transmission distance and interferes with another signal cable.

SUMMARY

Embodiments of this specification provide a data transmission cable and a related device, to resolve a problem that a MIPI bus has poor transmission quality and a short transmission distance and interferes with another signal cable.

According to a first aspect, an embodiment of this specification provides a data transmission cable, and the data transmission cable includes:

a signal bundle, where the signal bundle includes at least three signal cables, the at least three signal cables are disposed at intervals, pairwise signal cables form a differential pair signal cable, and the differential pair signal cable is used to transmit a differential data signal;

a ground cable, where the ground cable encircles and covers the signal bundle, and the ground cable is used to transmit a ground signal and isolate the signal bundle from a signal bundle of another data transmission cable; and a filling medium, where the filling medium is disposed in space on an inner side of the ground cable except the signal cable.

Optionally, a cross section of the ground cable is annular, and cross sections of the at least three signal cables are circular.

Optionally, the at least three signal cables are disposed in parallel.

Optionally, impedance of each signal cable is greater than or equal to 45 ohms and is less than or equal to 55 ohms.

Optionally, the at least three signal cables are three signal cables, and the three signal cables are disposed on the inner side of the ground cable in rotationally symmetrical distribution.

Optionally, the filling medium is a flexible material, and the flexible material is preferably polyethylene.

Optionally, the data transmission cable further includes a first protective layer, and the first protective layer covers the ground cable.

Optionally, the first protective layer is an insulating plastic material.

According to a second aspect, an embodiment of this specification provides an electronic device. The electronic device includes a camera module, a device mainboard, and a transmission cable, the device mainboard includes an image processor, the transmission cable includes a second protective layer and at least two data transmission cables according to the first aspect, and the second protective layer covers the data transmission cables; and the camera module transmits image data to the image processor by using the at least two data transmission cables according to the first aspect.

Optionally, the transmission cable further includes a working voltage transmission cable and a control signal transmission cable, and the working voltage transmission cable and the control signal transmission cable are disposed in the second protective layer.

The device mainboard provides a working voltage for the camera module by using the working voltage transmission cable.

The device mainboard further transmits a control signal to the camera module by using the control signal transmission cable.

Optionally, the working voltage includes at least one of the following: an analog voltage AVDD, a digital voltage DVDD, a voice coil motor voltage VCM_VDD, a drive chip voltage DRV_VDD, or an interface circuit voltage DOVDD.

Optionally, the control signal includes at least one of the following: a reset signal RST, a clock signal CLK, or an inter-integrated circuit I2C bus.

Optionally, a cross section of the transmission cable is rectangular or circular.

Optionally, the working voltage transmission cable and the control signal transmission cable are jointly disposed on one side of the data transmission cable, and the working voltage transmission cable and the control signal transmission cable are disposed side by side.

Optionally, the working voltage transmission cable and the control signal transmission cable are separately disposed on two sides of a connection line of the at least two data transmission cables.

It may be understood that, in embodiments of this specification, the data transmission cable includes the signal bundle, the ground cable, and the filling medium, and the at least three signal cables included in the signal bundle are disposed at intervals and pairwise signal cables form a differential pair signal cable, so that at least three groups of differential data signals can be transmitted, long-distance MIPI C-PHY data signal transmission is implemented, and signal transmission quality is improved. The ground cable encircles and covers the signal bundle. In addition to transmitting the ground signal, the signal bundle may be isolated from a signal bundle of another data transmission cable, so that interference caused by an external signal cable to the signal cable inside the data transmission cable is reduced. The filling medium is disposed in the space on the inner side of the ground cable except the signal cable, so that mutual interference between the signal cables inside the data transmission cable is reduced.

These aspects or other aspects of this specification are clearer and more comprehensible in descriptions of the following embodiments.

BRIEF DESCRIPTION OF DRAWINGS

To describe the technical solutions in embodiments of this specification or in the conventional technology more clearly, the following briefly introduces the accompanying drawings used in describing embodiments or the conventional technology. It is clear that the accompanying drawings in the following descriptions show some embodiments of this specification, and a person of ordinary skill in the art may still derive other drawings from these accompanying drawings without creative efforts.

FIG. 4 (*b*) and FIG. 4 (*c*) are respectively schematic diagrams of structures of a longitudinal section and a cross section of a data transmission cable according to an embodiment of this specification:

FIG. 4 (*d*) is a diagram of comparison between transmission cable insertion loss of a data transmission cable provided in an embodiment of this specification and transmission cable insertion loss of a data transmission cable provided in a conventional technology:

FIG. 5 (*b*) is a schematic diagram of a cross section of a transmission cable according to an embodiment of this specification; and FIG. 5 (*c*) is a schematic diagram of a cross section of another transmission cable according to an embodiment of this specification.

DESCRIPTION OF EMBODIMENTS

So a person skilled in the art understand the technical solutions in this specification better, the following clearly describes the technical solutions in embodiments of this specification with reference to the accompanying drawings in embodiments of this specification. It is clear that the described embodiments are merely a part rather than all of embodiments of this specification. All other embodiments obtained by a person of ordinary skill in the art based on embodiments of this specification without creative efforts shall fall within the protection scope of this specification.

Details are separately described in the following.

In the specification, claims, and accompanying drawings of this specification, the terms "first", "second", "third", "fourth" and so on are intended to distinguish between different objects but do not indicate a particular order. In addition, terms "include", "have", and any other variant thereof are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Mentioning an "embodiment" in the specification means that a particular characteristic, structure, or feature described with reference to the embodiment may be included in at least one embodiment of this specification. The phrase shown in various locations in the specification may not necessarily refer to a same embodiment, and is not an independent or optional embodiment exclusive from another embodiment. It is explicitly and implicitly understood by a person skilled in the art that embodiments described in the specification may be combined with another embodiment.

In the following, some terms in this application are described, to help a person skilled in the art have a better understanding.

Figure 1:
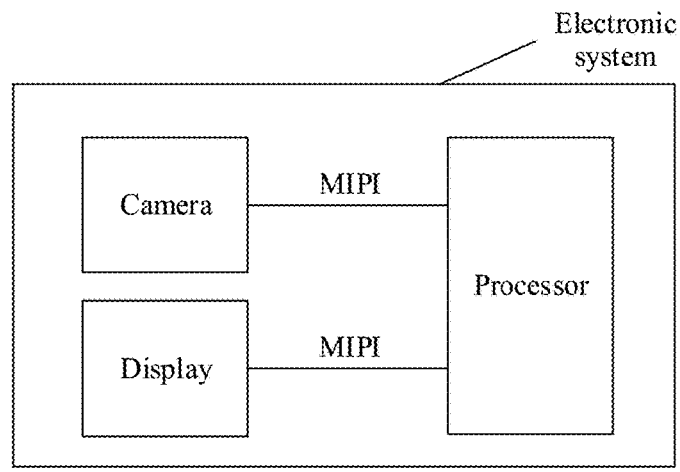
FIG. 1 is a schematic diagram of an electronic system in which data is transmitted by using a MIPI bus in a conventional technology.
Figure 2:
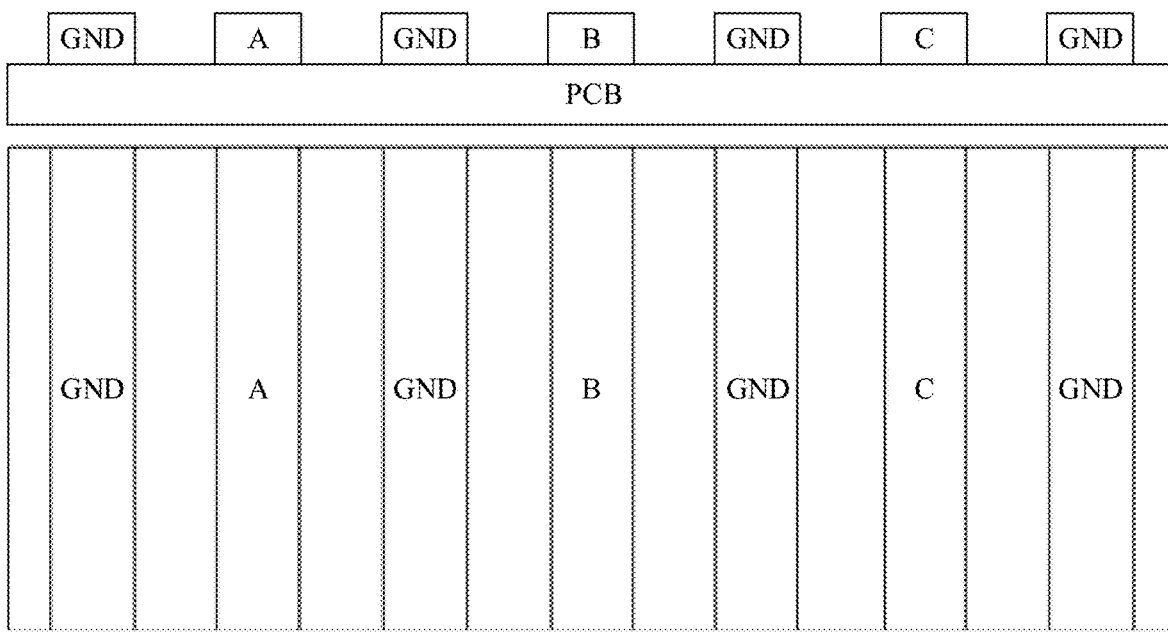
FIG. 2 is a schematic diagram of a structure of a MIPI C-PHY transmission cable in a conventional technology.

Refer to FIG. 1 and FIG. 2. FIG. 1 is a schematic diagram of an electronic system in which data is transmitted by using a MIPI bus in a conventional technology. FIG. 2 is a schematic diagram of a structure of a MIPI C-PHY transmission cable in the conventional technology. As shown in FIG. 1, a camera module, a display module, and a processor are integrated in the electronic system. Because a volume contained within the electronic system is limited, and a distance between the camera module, the display module, and the processor is relatively short (generally within a range of 30 cm), a MIPI signal is usually transmitted between the camera module, the display module, and the processor by using a PCB cabling structure shown in FIG. 2, and a MIPI C-PHY signal is transmitted by using three cables (that is, A, B, and C). This solution poses a strict requirement on link loss and interference between PCB cables.

Therefore, the foregoing prior art solution has the following three disadvantages:

First, the MIPI signal is affected by loss of the PCB cable, and a transmission distance is usually within 30 cm, and therefore, a long-distance application scenario such as a smart screen, vehicle mounting, and security cannot be provided.

Second, a MIPI high-speed signal is sensitive to the loss of the PCB cable, and consequently, signal transmission quality is poor (for example, there is a problem such as stripes in a photo).

Third, because the MIPI signal has a high transmission rate, electromagnetic interference generated by the MIPI signal is large, and the MIPI signal is also susceptible to interference from another signal, working stability of a device is affected (for example, a display screen blurs).

Figure 3:
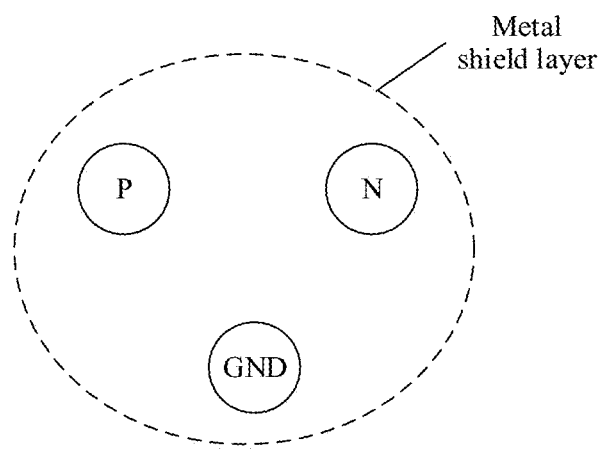
FIG. 3 is a schematic diagram of a structure of a cable used to transmit a pair of high-speed differential signals in a conventional technology.
Figure 4A:
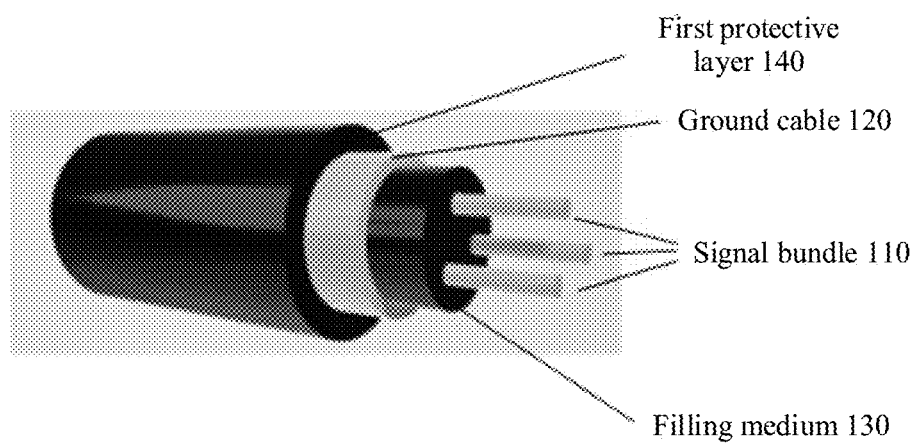
FIG. 4 (*a*) is a schematic diagram of a structure of a data transmission cable according to an embodiment of this specification.
Figure 4B:
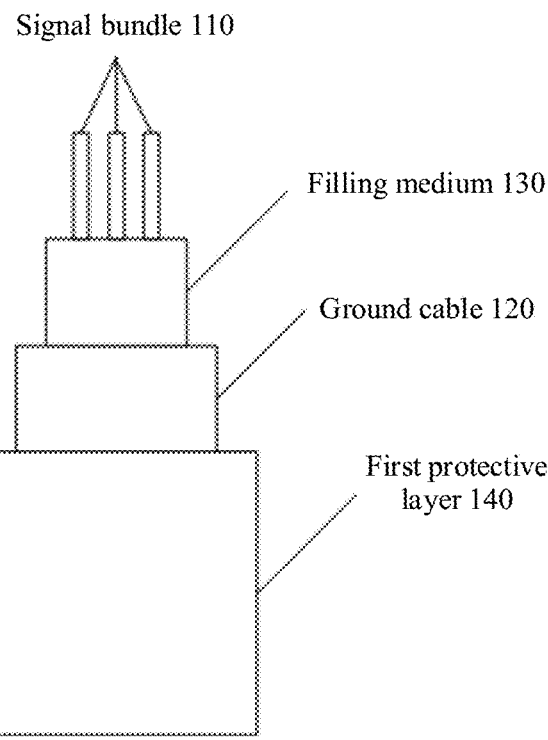
Figure 4C:
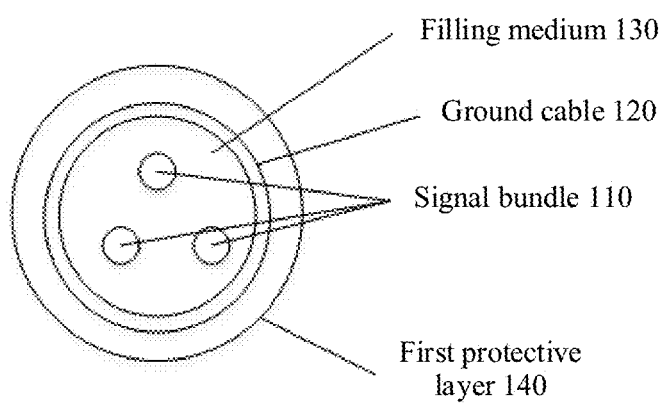
Figure 4D:
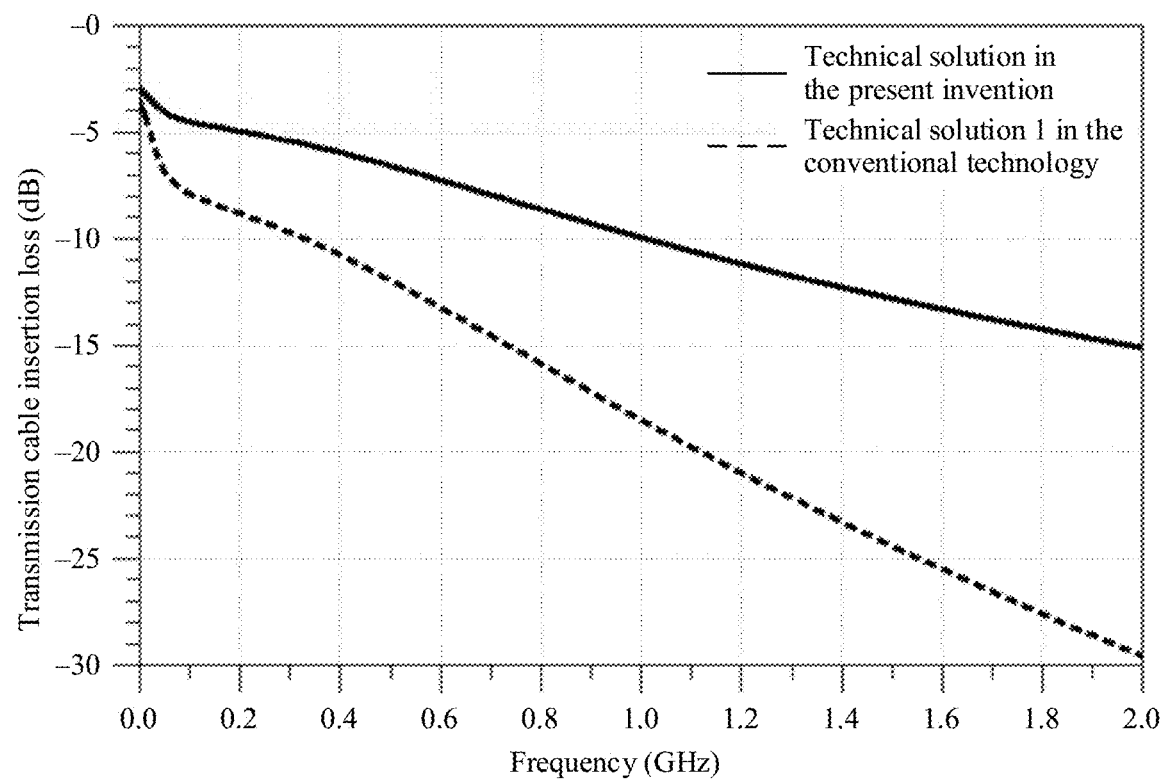

FIG. 3 is a schematic diagram of a structure of a cable used to transmit a pair of high-speed differential signals in a conventional technology. Signal cables P and N form a pair of differential signals, and GND is a ground signal. The cable has a metal shielding layer, so that transmission quality of a differential signal can be ensured during long-distance transmission, and a transmission distance can exceed 1 meter.

It can be understood that in this solution, because the signal cables P and N can form only one pair of differential signals, only one group of differential signals can be transmitted. However, during transmission of a C-PHY signal, three cables of this type need to be used for transmission, and there is a redundant cable, and consequently, a relatively large volume is occupied.

To resolve the foregoing problem, an embodiment of this specification provides a data transmission cable and a related device. Refer to the following apparatus-side embodiment.

Refer to FIG. 4 (a), FIG. 4 (b), and FIG. 4 (c). FIG. 4 (a) is a schematic and side perspective diagram of a structure of a data transmission cable according to an embodiment of this specification. FIG. 4 (b) and FIG. 4 (c) are respectively schematic diagrams of structures of a longitudinal section and a cross section of a data transmission cable, respectively, according to an embodiment of this specification. A data transmission cable 100 includes:
- a signal bundle 110, where the signal bundle includes at least three signal cables, the at least three signal cables are disposed at intervals, pairwise signal cables form a differential pair signal cable, and the differential pair signal cable is used to transmit a differential data signal:
- a ground cable 120, where the ground cable 120 encircles and covers the signal bundle 110, and the ground cable 120 is used to transmit a ground signal and isolate the signal bundle 110 from a signal bundle 110 of another data transmission cable 100; and
- a filling medium 130, where the filling medium 130 is disposed in space on an inner side of the ground cable 120 except the signal cable.

It may be understood that, in this embodiment of this specification, the data transmission cable includes the signal bundle, the ground cable, and the filling medium, and the at least three signal cables included in the signal bundle are disposed at intervals and pairwise signal cables form a differential pair signal cable, so that at least three groups of differential data signals can be transmitted, long-distance MIPI C-PHY data signal transmission is implemented, and signal transmission quality is improved. The ground cable encircles and covers the signal bundle. In addition to transmitting the ground signal, the signal bundle may be isolated from a signal bundle of another data transmission cable, so that interference caused by an external signal cable to the signal cable inside the data transmission cable is reduced. The filling medium is disposed in the space on the inner side of the ground cable except the signal cable, so that mutual interference between the signal cables inside the data transmission cable is reduced.

Optionally, a cross section of the ground cable 120 is annular, and cross sections of the at least three signal cables are circular.

Optionally, the cross sections of the at least three signal cables may alternatively be a square, a rectangle, a circular arc, or another shape. The shape is not limited herein.

Optionally, the at least three signal cables may be disposed in parallel.

Optionally, the at least three signal cables may alternatively be spirally wound around a same axis.

When the at least three signal cables are disposed in parallel, distances between the at least three signal cables may be equal or unequal. The spacing is not limited herein.

The axis may be an axis in which a center of a circle is located, or may be an axis in which any point in a circle is located. This is not limited herein.

Optionally, impedance of each signal cable is greater than or equal to 45 ohms and is less than or equal to 55 ohms.

Optionally, the at least three signal cables are three signal cables, and the three signal cables are disposed on the inner side of the ground cable in rotationally symmetrical distribution.

It should be noted that, if there are three signal cables, an angle of rotational symmetry is 120°: if there are four signal cables, an angle of rotational symmetry is 90°: if there are five signal cables, an angle of rotational symmetry is 72°; and so on.

Optionally, the filling medium 130 is a flexible material, and the flexible material is preferably polyethylene.

Optionally, the data transmission cable 100 further includes a first protective layer 140, and the first protective layer covers the ground cable 120.

Optionally, the first protective layer 140 is an insulating plastic material.

FIG. 4 (d) is a diagram of comparison between transmission cable insertion loss of the data transmission cable provided in this embodiment of this specification and transmission cable insertion loss of a data transmission cable provided in a conventional technology. Both the data transmission cable provided in this embodiment of this specification and the data transmission cable provided in the conventional technology are 1.2 m. It may be understood from FIG. 4 (d) that, when a same transmission medium is used, the transmission cable insertion loss of the data transmission cable provided in this embodiment of this specification is lower than the transmission cable insertion loss of the data transmission cable provided in the conventional technology. At a frequency of 1 GHZ, the transmission cable insertion loss of the data transmission cable provided in this embodiment of this specification is reduced by 8.559 dB. Therefore, the data transmission cable provided in this embodiment of this specification can improve transmission quality of a MIPI signal, and increase a transmission distance of the MIPI signal.

Figure 5A:
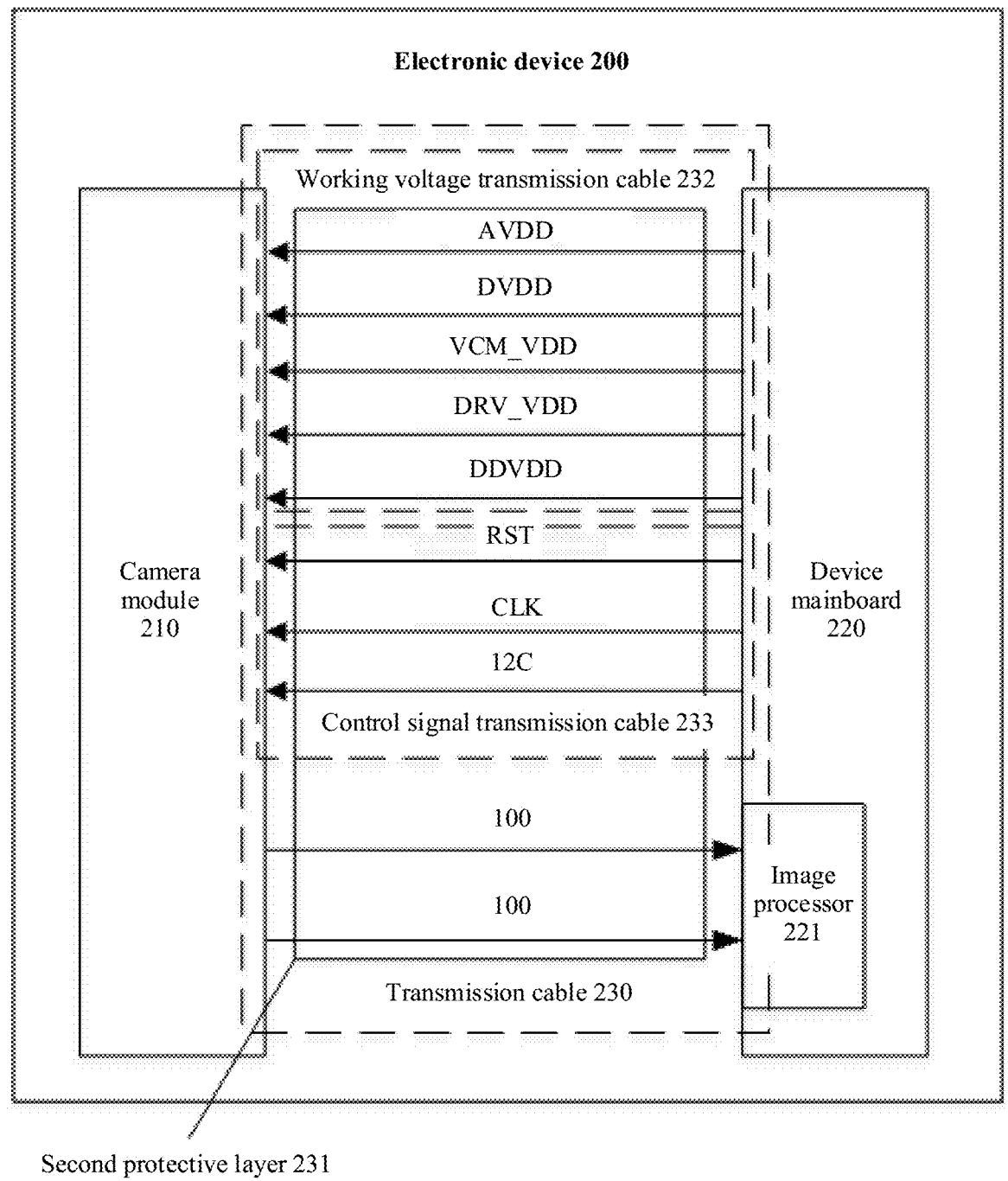
FIG. 5 (*a*) is a schematic diagram of a structure of an electronic device according to an embodiment of this specification.
Figure 5B:
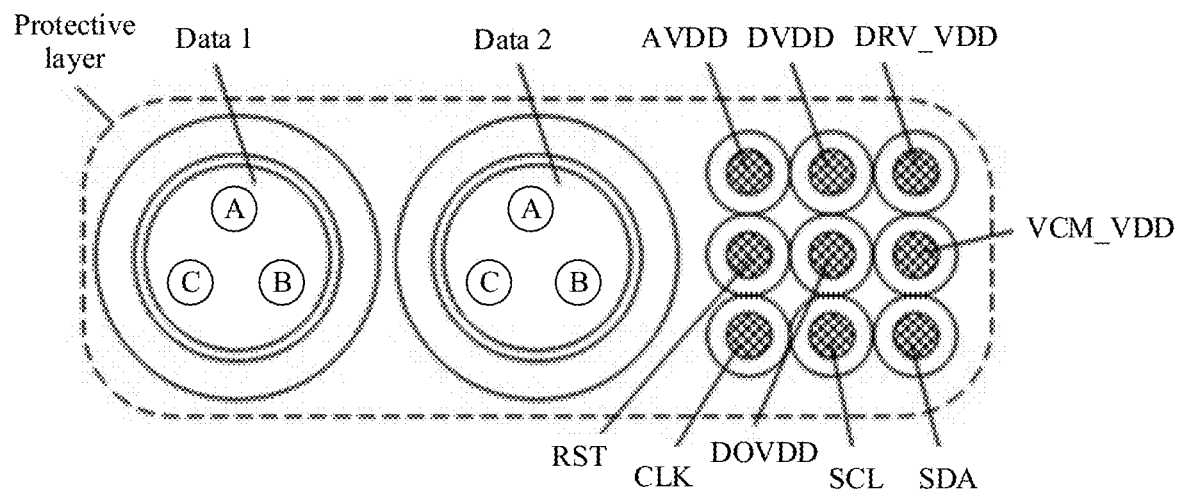
Figure 5C:
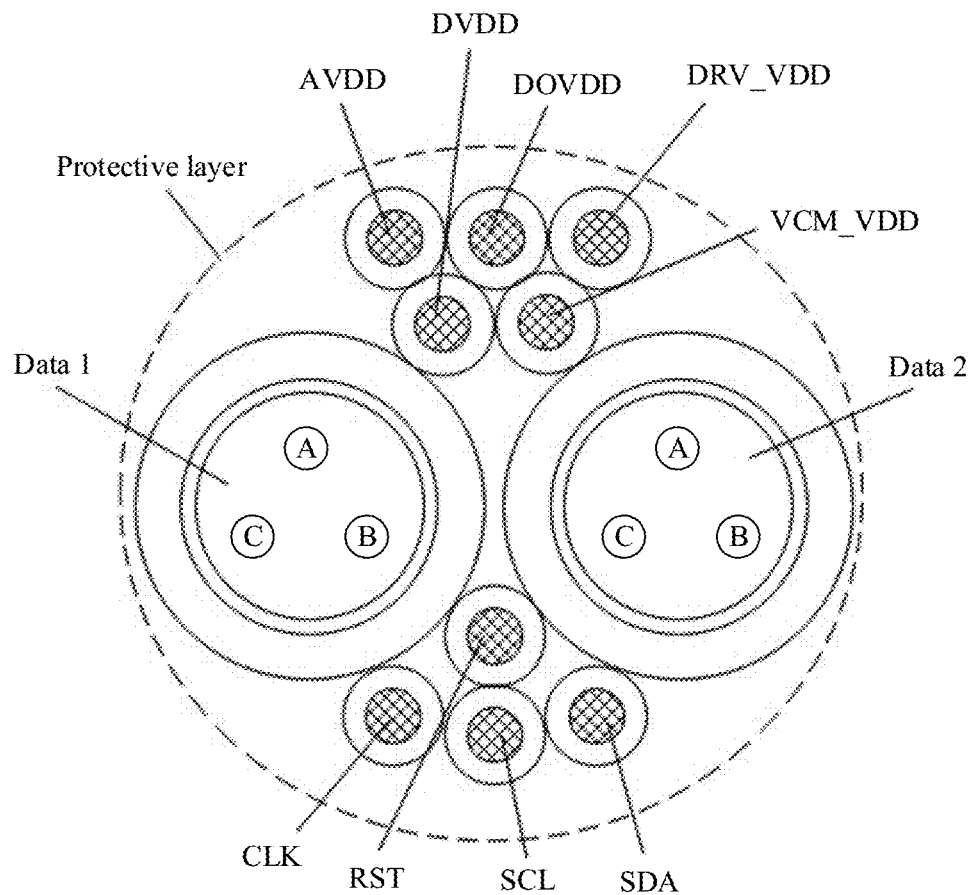

FIG. 5 (a) is a schematic diagram of a structure of an electronic device according to an embodiment of this specification. The electronic device is applied to a mobile terminal, a smart screen, a vehicle-mounted terminal, a security terminal, and the like. The electronic device 200 includes a camera module 210, a device mainboard 220, and a transmission cable 230, the device mainboard 220 includes an image processor 221, the transmission cable 230 includes a second protective layer 231 and at least two foregoing data transmission cables 100, and the second protective layer 231 covers the data transmission cable 100.

The camera module 210 transmits image data to the image processor 221 by using the at least two foregoing data transmission cables 100.

It may be understood that, in this embodiment of this specification, a plurality of groups of signals of different types can be transmitted between the camera module and the device mainboard, interference between different signal cables is reduced through shielding protection, and link loss is reduced through transmission cable impedance matching, so that long-distance transmission of a high-speed signal is implemented.

Optionally, the transmission cable 230 further includes a working voltage transmission cable 232 and a control signal transmission cable 233, and the working voltage transmission cable 232 and the control signal transmission cable 233 are disposed in the second protective layer 231.

The device mainboard 220 provides a working voltage for the camera module 210 by using the working voltage transmission cable 232.

The device mainboard 220 further transmits a control signal to the camera module 210 by using the control signal transmission cable 233.

Optionally, the working voltage includes at least one of the following: an analog voltage AVDD, a digital voltage DVDD, a voice coil motor voltage VCM_VDD, a drive chip voltage DRV_VDD, or an interface circuit voltage DOVDD.

The AVDD is an analog voltage required by working of (to work) the camera module, the DVDD is a digital voltage required by working of (to work) the image sensor, the VCM_VDD is a voltage required by working of (to work) a voice coil motor, the DRV_VDD is a voltage required by working of (to work) a drive chip, and the DOVDD is a digital voltage required by working of (to work) a data input/output module.

Optionally, the control signal includes at least one of the following: a reset signal RST, a clock signal CLK, or an inter-integrated circuit (I2C) bus.

RST is an abbreviation of RESET. The RESET signal is usually used in a circuit with a CPU, for resetting and initialization. During power-on, the circuit needs to be initialized by using the RESET signal. When a working status of the circuit is abnormal and is shut down, the circuit also needs to be restarted by using the RESET signal.

CLK is an abbreviation of CLOCK, and is a shift pulse provided for a shift register, and each pulse enables data to be shifted in or out by one bit. Data on a data interface needs to be coordinated with the clock signal before the data is normally transmitted. A frequency of a data signal needs to be ½ of a frequency of the clock signal.

I2C is a conventional, simple bidirectional two-wire synchronous serial bus developed by Philips. The I2C requires only two wires to transmit information between components on the bus. The I2C includes serial data (SDA) and a serial clock (SCL).

Optionally, a cross section of the transmission cable 230 is rectangular or circular.

Optionally, the working voltage transmission cable 232 and the control signal transmission cable 233 are jointly disposed on one side of the data transmission cable 100, and the working voltage transmission cable 232 and the control signal transmission cable 233 are disposed side by side.

FIG. 5 (b) is a schematic diagram of a cross section of a transmission cable according to an embodiment of this specification. In FIG. 5 (b), the working voltage transmission cable and the control signal transmission cable are jointly disposed on one side of the data transmission cable, the working voltage transmission cable and the control signal transmission cable are disposed side by side, and working voltage transmission cables AVDD, DVDD, VCM_VDD, DRV_VDD, and DOVDD and control signal transmission cables RST, CLK, SCL, and SDL form a rectangular array and are disposed side by side.

Optionally, the working voltage transmission cable 232 and the control signal transmission cable 233 are separately disposed on two sides of a connection line of the at least two data transmission cables 100.

FIG. 5 (c) is a schematic diagram of a cross section of another transmission cable according to an embodiment of this specification. In FIG. 5 (c), the working voltage transmission cable and the control signal transmission cable are separately disposed on two sides of a connection line of two data transmission cables. The two data transmission cables are disposed opposite to each other, and working voltage transmission cables AVDD, DVDD, VCM_VDD, DRV_VDD, and DOVDD are disposed opposite to control signal transmission cables RST, CLK, SCL, and SDL.

Embodiments of the present invention are described in detail above. The principle and implementation of the present invention are described herein through specific examples. The description about embodiments of the present invention is merely provided to help understand the method and core ideas of the present invention. In addition, a person of ordinary skill in the art can make variations and modifications to the present invention in terms of the specific implementations and application scopes according to the ideas of the present invention. Therefore, the content of specification shall not be construed as a limit to the present invention.

What is claimed is:

1. A data transmission cable, comprising:
a signal bundle comprising at least three signal cables, the at least three signal cables are disposed at intervals, pairwise signal cables form a differential pair signal cable configured to transmit a differential data signal;
a ground cable that encircles and covers the signal bundle, and is configured to transmit a ground signal and isolate the signal bundle from a signal bundle of another data transmission cable; and
a filling medium disposed in space defined by an inner side of the ground cable except the signal cable.

2. The data transmission cable according to claim 1, wherein a cross section of the ground cable is annular, and cross sections of the at least three signal cables are circular.

3. The data transmission cable according to claim 1, wherein the at least three signal cables are disposed in parallel.

4. The data transmission cable according to claim 1, wherein impedance of each signal cable is greater than or equal to 45 ohms and is less than or equal to 55 ohms.

5. The data transmission cable according to claim 1, wherein the at least three signal cables consist of three signal cables disposed on the inner side of the ground cable in rotationally symmetrical distribution.

6. The data transmission cable according to claim 1, wherein the filling medium comprises a flexible material.

7. The data transmission cable according to claim 1, wherein the data transmission cable further comprises a first protective layer that covers the ground cable.

8. The data transmission cable according to claim 7, wherein the first protective layer comprises an insulating plastic material.

9. An electronic device comprising:
a camera module,
a device mainboard comprising an image processor, and
a transmission cable comprising a protective layer and at least two data transmission cables, the protective layer covering the data transmission cables,
wherein at least one of the data transmission cable comprises:
a signal bundle comprising at least three signal cables disposed at intervals, pairwise signal cables forming a differential pair signal cable configured to transmit a differential data signal;
a ground cable encircling and covering the signal bundle, the ground cable configured to transmit a ground signal and isolate the signal bundle from a signal bundle of another data transmission cable; and a filling medium disposed in space defined by an inner side of the ground cable except the signal cable; and the camera module is configured to transmit image data to the image processor by using the at least two data transmission cables.

10. The electronic device according to claim 9, wherein the transmission cable further comprises a working voltage transmission cable and a control signal transmission cable, disposed in the protective layer;

the device mainboard provides a working voltage for the camera module by using the working voltage transmission cable; and the device mainboard further transmits a control signal to the camera module by using the control signal transmission cable.

11. The electronic device according to claim 10, wherein the working voltage comprises at least one of the following: an analog voltage AVDD, a digital voltage DVDD, a voice coil motor voltage VCM_VDD, a drive chip voltage DRV_VDD, and/or an interface circuit voltage DOVDD.

12. The electronic device according to claim 10, wherein the control signal comprises at least one of the following: a reset signal RST, a clock signal CLK, or an inter-integrated circuit I2C bus.

13. The electronic device according to claim 10, wherein the working voltage transmission cable and the control signal transmission cable are jointly disposed on one side of the at least one data transmission cable, and the working voltage transmission cable and the control signal transmission cable are disposed side by side.

14. The electronic device according to claim 10, wherein the working voltage transmission cable and the control signal transmission cable are separately disposed on two sides of a connection line of the at least two data transmission cables.

15. The electronic device according to claim 9, wherein a cross section of the transmission cable is rectangular or circular.

16. A transmission cable comprising:

first, second and third signal conductors;

a first shield surrounding the first, second and third signal conductors;

a first filler disposed within the first shield to space the first, second and third signal conductors apart from one another;

fourth, fifth and sixth signal conductors;

a second shield surrounding the fourth, fifth and sixth signal conductors;

a second filler disposed within the second shield to space the first, second and third signal conductors apart from one another; and a protective layer enclosing the first and second shields and at least one further conductor, wherein the first and second signal conductors in use convey a first differential signal, the second and third signal conductors in use convey a second differential signal, and the first and third signal conductors in use convey a third differential signal.

17. The transmission cable of claim 16 wherein the first, second and third differential signals comprise MIPI C-PHY differential signals.

18. The transmission cable of claim 16 wherein the first filler completely encloses the volume within the first shield except for the first, second and third signal conductors.

19. The transmission cable of claim 16 wherein each signal conductor has an impedance that is greater than or equal to 45 Ohms and less than or equal to 55 Ohms.

* * * * *